United States Patent [19]
Yerkes

[11] Patent Number: 4,889,301
[45] Date of Patent: Dec. 26, 1989

[54] STAND FOR A SHORTHAND MACHINE

[76] Inventor: Patricia J. Yerkes, 2478 Erin Way, Eugene, Oreg. 97401

[21] Appl. No.: 308,640

[22] Filed: Feb. 10, 1989

[51] Int. Cl.⁴ ............................................. F16M 13/00
[52] U.S. Cl. ..................................................... 248/124
[58] Field of Search ............... 248/676, 124, 176, 178, 248/179, 287, 286

[56] References Cited

U.S. PATENT DOCUMENTS

| | | | |
|---|---|---|---|
| 1,111,608 | 9/1914 | O'Brien | 248/124 |
| 1,823,535 | 9/1931 | Frutkow | 248/124 |
| 2,470,694 | 5/1949 | Foo | 248/124 |
| 2,548,650 | 4/1951 | Brandt | 248/124 |
| 2,560,884 | 7/1951 | Nagourney | 248/124 |
| 2,593,075 | 4/1952 | Vale | 248/124 |
| 2,613,901 | 10/1952 | Tatar | 248/176 |
| 2,718,231 | 9/1955 | DeLano | 248/124 |
| 2,765,796 | 10/1956 | Guenther | 248/124 |
| 4,671,478 | 6/1987 | Schoenig | 248/124 |
| 4,741,504 | 5/1988 | Monroe | 248/286 |

Primary Examiner—Ramon O. Ramirez
Assistant Examiner—Robert A. Olson
Attorney, Agent, or Firm—James D. Givnan, Jr.

[57] ABSTRACT

The base tripod adjustably supports a post structure having a horizontal arm segment at its upper end. A pivot at the arm segment outer end adjustably carries an arm positionable about a horizontal axis of the pivot means. A shorthand machine is mounted on the arm by means of a slide positionable and lockable along the arm. The pivot means includes a lock which serves to retain the machine's supporting arm at a desired inclination. A limit stop on the arm limits slide movement.

3 Claims, 1 Drawing Sheet

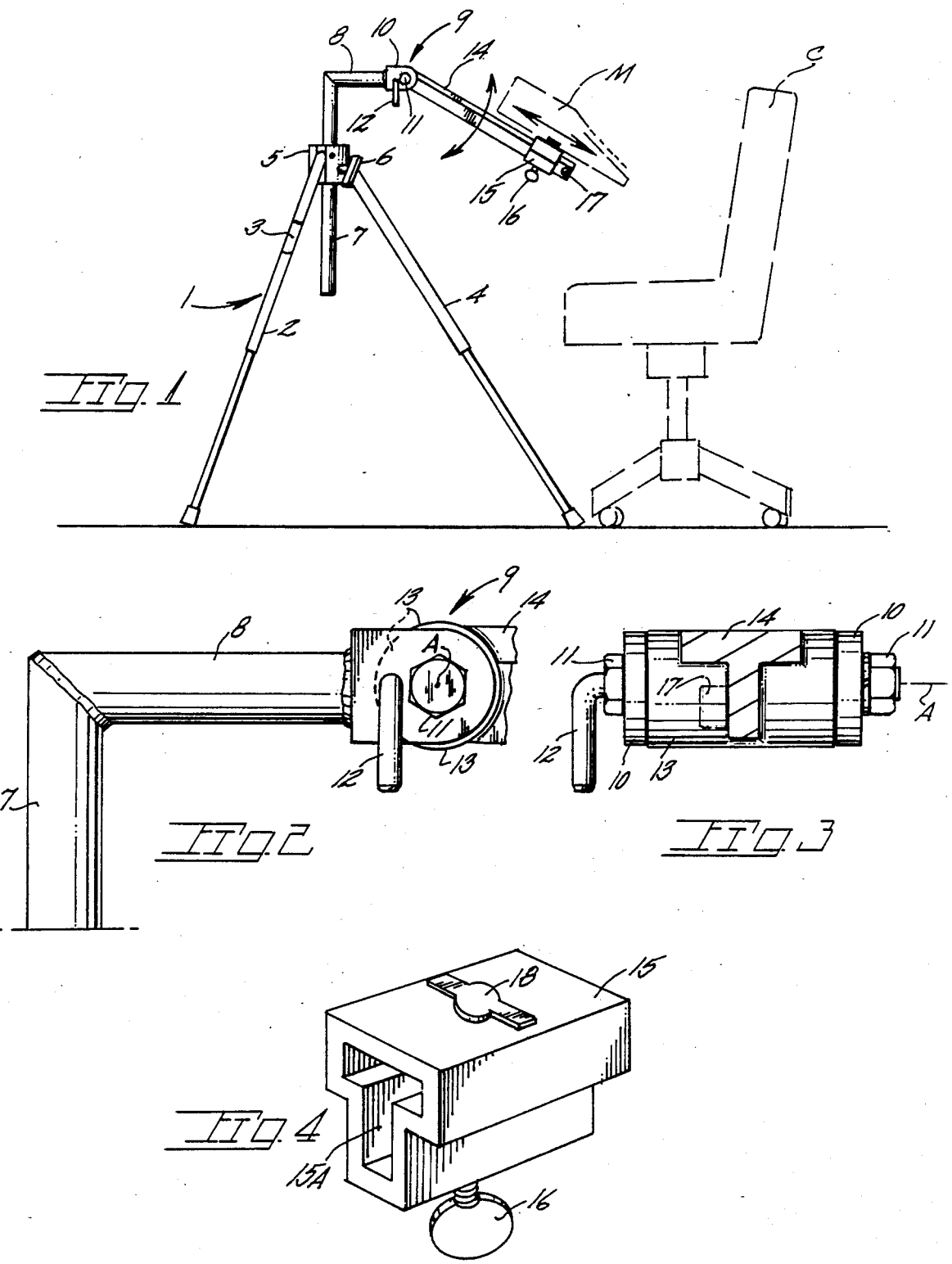

STAND FOR A SHORTHAND MACHINE

BACKGROUND OF THE INVENTION

The present invention concerns adjustable stands on which is supported a shorthand machine during use.

Currently in use are shorthand machine stands having a vertical post which is adjustable and supportingly engages the underside of the shorthand machine. Such stands do not permit the machine to be conveniently positioned for the user resulting in fatigue of the lower arms and wrists. Further, no provision is made for supporting the shorthand machine at an inclination minimizing muscular effort.

SUMMARY OF THE PRESENT INVENTION

The present invention is embodied within a shorthand machine stand which provides a wide range of machine positions to suit the users preference.

A base, preferably a tripod, adjustably supports a post with the post having an angular arm segment. Pivot means on the arm segment is equipped with a lock to enable a stand arm to be locked in place. The arm is normally inclined to the horizontal and carries machine mounting means in the form of a slide. Accordingly, the shorthand machine may be positioned both along the arm toward and away from the user with the pivot means enabling desired inclination of the shorthand machine. The pivot means includes a locking arrangement to prevent inadvertent downward movement of the arm. The arm is preferably of tee section for purposes of strength.

Important objectives of the present stand is the provision of a shorthand machine stand readily adjustable for positioning the machine throughout a wide range of positions to best suit the user; the provision of a shorthand machine stand having a post including an angularly disposed arm segment to locate the shorthand machine in close proximity to the user; the provision of a shorthand machine stand with lockable pivot means to prevent accidental displacement of the machine.

BRIEF DESCRIPTION OF THE DRAWINGS

In the accompanying drawings:

FIG. 1 is a side elevational view of the stand operatively disposed;

FIG. 2 is a fragmentary elevational view of the upper portion of a post component of the stand with the stand arm repositioned to the horizontal; and FIG. 3 is an end elevational view of FIG. 2 taken from the right side of FIG. 2.

FIG. 4 is a perspective view of the machine carrying slide.

DETAILED DESCRIPTION OF THE PREFERRED EMBODIMENTS

With continuing attention to the drawings wherein applied reference numerals indicate parts similaly hereinafter identified, the reference numeral 1 indicates generally a base of the present stand which may be a tripod having legs 2, 3 and 4.

The base additionally includes a collar 5 which receives the upper ends of the legs with the latter pivotally secured thereto in a suitable manner. A setscrew 6 extends into a central opening in collar 5 to frictionally engage a post 7 to lock same in place within the stand collar. An arm segment 8 of the post extends outwardly from the latter in a right angular manner and carries pivot means indicated generally at 9.

Pivot means 9 includes a clevis 10 with the clevis ears apertured to receive a fastener assembly 11. A lock 12 is in threaded engagement with one of the clevis ears and terminates inwardly of the ear for biased engagement with a boss 13 of an arm 14 of the stand. Boss 13 is pivotally carried for movement about axis A of fastener assembly 11. Arm 14 is preferably of tee section to slidably receive a machine carrying slide 15 defining an opening 15A of tee shape and positionable along the arm and lockable to the arm by means of a thumbscrew 16. Slide 15 includes a shorthand machine mount 18 of the type compatible with the various makes of shorthand machines. A limit stop screw 17 prevents inadvertent separation of the slide 15 from the arm.

In use, the post is adjusted for the desired height with arm 14 positioned about axis A for desired inclination of the machine at M. Positioning of slide 15 locates the machine along the inclined arm toward and away from the user in chair C. When the stand is collapsed for travel, the arm segment 8 serves as a handle. While a shorthand machine is disclosed, it is understood that various other machines or articles may be supported by the present stand.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. A stand for adjustably supporting a machine in an inclined manner, said stand comprising, a base, a post adjustably supported by said base for vertical adjustment and including an arm segment having a distal end, pivot means on said distal end having a horizontal axis, said pivot means including a clevis, a lock in place on said clevis, an arm having a boss carried by said clevis and positionable in an inclined manner about said horizontal axis, a slide adjustably mounted on said arm and lockable thereto at points therealong, said slide including a mount insertable into the base of a machine, and said slide defining an opening of tee shape generally corresponding to a cross section of said arm, said arm including a limit stop screw contactible by the slide to limit travel of said slide to prevent accidental separation of a machine from the arm.

2. The stand claimed in claim 1 wherein said post arm segment is tubular and is right angularly disposed to said post.

3. The stand claimed in claim 1 wherein said lock is in threaded engagement with said clevis for locking engagement with said boss to retain the arm at selected inclined positions about the horizontal axis.

* * * * *